United States Patent
Wang et al.

(10) Patent No.: US 6,212,291 B1
(45) Date of Patent: Apr. 3, 2001

(54) METHOD FOR RECOGNIZING MULTIPLE IRRADIATION FIELDS IN DIGITAL RADIOGRAPHY

(75) Inventors: Xiaohui Wang; Jiebo Luo, both of Rochester; Robert A. Senn, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/015,656

(22) Filed: Jan. 29, 1998

(51) Int. Cl.$^7$ .................................................. G06K 9/00
(52) U.S. Cl. ........................................ 382/132; 382/173
(58) Field of Search ................................. 382/132, 128, 382/129, 131, 133, 134, 164, 170, 173; 378/2, 4, 70, 146; 250/390.02, 584

(56) References Cited

U.S. PATENT DOCUMENTS

| | | | |
|---|---|---|---|
| 4,262,202 | * 4/1981 | Cusano et al. | 250/366 |
| 4,804,842 | 2/1989 | Nakajima | 250/372.2 |
| 4,952,805 | 8/1990 | Tanaka | 250/327.2 |
| 4,952,807 | 8/1990 | Adachi | 250/327.2 |
| 4,970,393 | 11/1990 | Funahashi | 250/327.2 |
| 4,977,504 | 12/1990 | Funahashi | 382/132 |
| 4,995,093 | 2/1991 | Funahashi et al. | 382/132 |
| 5,032,733 | 7/1991 | Takeo et al. | 250/559.06 |
| 5,081,580 | 1/1992 | Takeo | 364/413.13 |
| 5,164,976 | * 11/1992 | Scheid et al. | 378/146 |
| 5,268,967 | 12/1993 | Jang et al. | 382/132 |
| 5,506,913 | 4/1996 | Ibison et al. | 382/132 |
| 5,646,416 | * 7/1997 | Van De Velde | 250/584 |
| 5,651,042 | 7/1997 | Dewaele | 378/62 |

FOREIGN PATENT DOCUMENTS 2-071247  3/1990  (JP).

OTHER PUBLICATIONS

Robert J. Pizzutiello, Jr., et al., Introduction to Medical Radiographic Imaging, pp. 166–170.

L.E. Antonuk, et al., *Empirical investigation of the signal performance of a high–resolution, indirect detection, active matrix flat–panel imager (AMFPI) for fluoroscopic and radiographic operation*, Med. Phys. 24(1), Jan. 1997, pp. 51–70.

* cited by examiner

Primary Examiner—Bhavesh Mehta
Assistant Examiner—Kanji Patel
(74) Attorney, Agent, or Firm—William F. Noval

(57) ABSTRACT

A method of processing a digital radiographic image comprising the steps of: providing a digital radiographic image having a plurality of radiation fields and collimation regions defined by collimation blades at least partially bounding the radiation fields; detecting and classifying pixels of the digital radiographic image as collimation boundary transition pixels; line-level delineating of a plurality of candidate collimation blades from the collimation boundary transition pixels; estimating the most likely partitioning; and determining at a region level the radiation field from the results of the partitioning estimating step.

23 Claims, 10 Drawing Sheets

Microfiche Appendix Included
(2 Microfiche, 45 Pages)

METHOD FOR RECOGNIZING MULTIPLE IRRADIATION FIELDS IN DIGITAL RADIOGRAPHY

MICROFICHE APPENDIX

This application has a microfiche appendix of one microfiche with twenty frames.

FIELD OF THE INVENTION

This invention relates in general to digital image processing, and more particularly relates to a method for the detection of collimation or, equivalently, detection of the radiation field in digital radiography to facilitate optimal tone scale enhancement, to minimize the viewing flare caused by the unexposed area, and to improve image segmentation, image compression, and body part identification.

BACKGROUND OF THE INVENTION

In digital radiography, computed radiography (CR) is a medical imaging technique that captures the information using storage phosphor screens. The information is stored as a latent image for later read-out by a laser scanning system (R. J. Pizzutiello and J. E. Cullinam, *Introduction to Medical Radiographic Imaging*, Eastman Kodak Company, 1993). The latent image signal remains stable for a certain period of time ranging from minutes to days. Using a red or near-infrared light to stimulate the phosphor which will then release its stored energy in the form of visible light, one can observe the phenomenon known as photostimulable luminescence. The intensity of the stimulated luminescence is proportional to the number of x-ray photons absorbed by the storage phosphor. In practice, the read-out process is accomplished using a laser scanner in order to provide high resolution data and also not to flood the screen with stimulating light. The stimulated light emitted from each point on the screen is collected and converted into digital signal. The screen can be refreshed by flooding the entire screen with high illuminance light. This allows the screen to be reused.

Recently, a new medical imaging technique called direct radiography (DR) has been introduced which uses an electronic detector to directly acquire digital signal (L. E. Antonuk et al., "Empirical investigation of the signal performance of a high-resolution, indirect detection, active matrix flat-panel imager (AMFPI) for fluoroscopic and radiographic operation", Med. Phys. 24(1), January 1997, pp. 51–70.).

In their practice, radiologists may use x-ray opaque materials to limit the radiation scattering, and shield the subjects from unnecessary exposure to x-rays. Such x-ray opaque materials constitute the "collimation". As illustrated in FIG. 9, the collimation blades 18,20 are placed in between the x-ray source 10 and the subject 14, and are typically closer to the source. As a result, those body parts of the patient which are not important to diagnosis but may be vulnerable are protected. Furthermore, the use of collimation can also limit the radiation scattering from unintended regions from fogging the storage phosphor plate 16. Moreover, a CR image may consist of one or more sub-images if the radiologists choose to make multiple exposures, typically of different projections of the same body part, on the same screen. Each sub-image corresponds to one x-ray irradiation field or one exposure.

In general, the resulting digital images need to be enhanced through code-value remapping in order to provide maximum visual contrast in the region of interest prior to display or printing. Such a process is referred to as tone scaling. The dynamic range of the CR systems (over 10,000:1) provides significant advantage over conventional film in terms of exposure latitude so that CR imaging is very tolerable to improper selection of exposure conditions. However, to optimally render such data on desired printing or display devices, it is necessary to develop tone scale remapping function. To this end, it is desirable to exclude the regions shadowed by the collimation from the calculation of the histogram statistics because these regions provide no useful information but distort the intensity histogram. Moreover, since the shadow regions are usually with the highest brightness levels (corresponding to minimum density), the flare can be reduced by setting the shadow regions to a comfortable brightness level or reducing their average brightness level. Such a process is referred to as masking. In the case of multiple-exposure images, it is desirable to separate individual radiation fields so that a best tone scale can be applied to each radiation field and masking can be performed to the best extent.

Radiation field recognition for one or more radiation fields, preferably done automatically, is the key to masking and is also important to tone scaling. However, it is a very challenging task. In CR, we have significant difficulties to overcome: (1) the boundaries between the region of interest (radiation field) and the shadow regions (collimation) are usually fuzzy due to the radiation scattering, (2) the region of interest often has significant modulation including prominent edges, (3) the shadow regions may have some comparable modulation and therefore are not uniform due to the radiation scattering from the region of interest, (4) boundaries may be invisible near very dense body parts due to the lack of x-ray penetration or the frequent underexposure in order to minimize the x-ray dosage.

Upon the extraction of the individual radiation fields, image processing can be performed in selective ways, including but not limited to: rendering the image using a globally optimal tone scale based on statistics gathered from the collection of extracted radiation fields, or rendering each radiation field using a locally optimal tone scale based on statistics gathered from a given radiation field, or rendering the collimation shadow region. etc.

Due to the practical use and the technical difficulties in collimation recognition, there have been considerable efforts on this subject in the past. Thus, U.S. Pat. No. 4,952,807 assumes that the collimation does not touch the object of the image and the search of collimation boundary is by scanning inwards from image borders to detect the object portion surrounded by the background region). The assumption is not always valid, in particular in shoulder or skull examinations. U.S. Pat. No. 4,804,842 excludes the shadow region by finding the first valley and thus removing the lower part of the histogram. The basic assumption of this invention is that the code values of the those pixels inside the radiation field should be higher than those of the pixels in the collimation shadow regions, which is not always valid. These two patents only address the tone scale problem which does not demand an explicit detection of the collimation boundaries. U.S. Pat. No. 4,970,393 thresholds 1st derivatives along predetermined scan lines. European Patent 0,342,379 (also Japan Patent 2,071,247 and U.S. Pat. No. 5,081,580) assumes strong signal-to-shadow boundaries in terms of the amplitude of the ID differentiation along the radial lines from the center of the image. European Patent 0,285,174, also referred to as U.S. Pat. No. 4,995,093, applies Hough Transform to edge pixels with significant gradient magnitude. European Patent 0,360,231, also referred to as U.S. Pat. No. 4,977,504, and U.S. Pat. No. 5,268,967 describe a distinctive approach which classifies non-overlapping small tiles. U.S. Pat. No. 4,952,805 tests a series of possible hypotheses with respect to the characteristics of the inside and the outside histograms to determine the presence or absence of a radiation field. Japanese Patent 7,181,609 is unique in that constructs a decision network consisting several parallel recognition processes, including a first means for detecting rectangular boundaries using boundary contrast, a second means for close-contour tracing to explicitly deal with arbitrarily curved shape irradiation field, a third means for irradiation field determination using imaging information (collimation shape and position, exposure, etc.) and exam type information, and a forth means using the projections. The final radiation is determined through a coordinating procedure.

There are a few patents particularly related to multiple-exposure images. U.S. Pat. No. 5,032,733, detects unexposed regions in multiple exposed images by locating low variation and low signal level regions. U.S. Pat. No. 5,268,967, divides the image into non-overlapping tiles, performs classification of these tiles, groups tiles of the same class into regions.

U.S. Pat. No. 5,651,042 is particularly relevant. This patent discloses a method for the automatic determination of the location of the boundary between multiple exposures and the boundary between signal and shadow regions within each exposure. This method focuses on the first task of multiple-exposure detection and integrates previous invention U.S. Pat. No. 5,506,913 into a complete system for recognizing one or more irradiation. Many hypotheses, or archetypes, as to the location of aforementioned boundaries are generated and the final decision as to the correct hypothesis is contingent on the results of a rule-based reasoning network. It is assumed that the placement of x-ray opaque material to permit multiple exposures is always to divide the image into two, approximately 2. The invention provides a robust performance while minimizing the number of thresholds and heuristics that must be determined during tuning and updating of the system.

3. The present invention is able to handle a wide variety of scenarios including more than two radiation fields in one radiographic image and overlapping radiation fields.

4. In summary, the present invention also offers advantages in flexibility, extendibility, efficiency and potential performance.

DETAILED DESCRIPTION OF THE INVENTION

Figure 10:
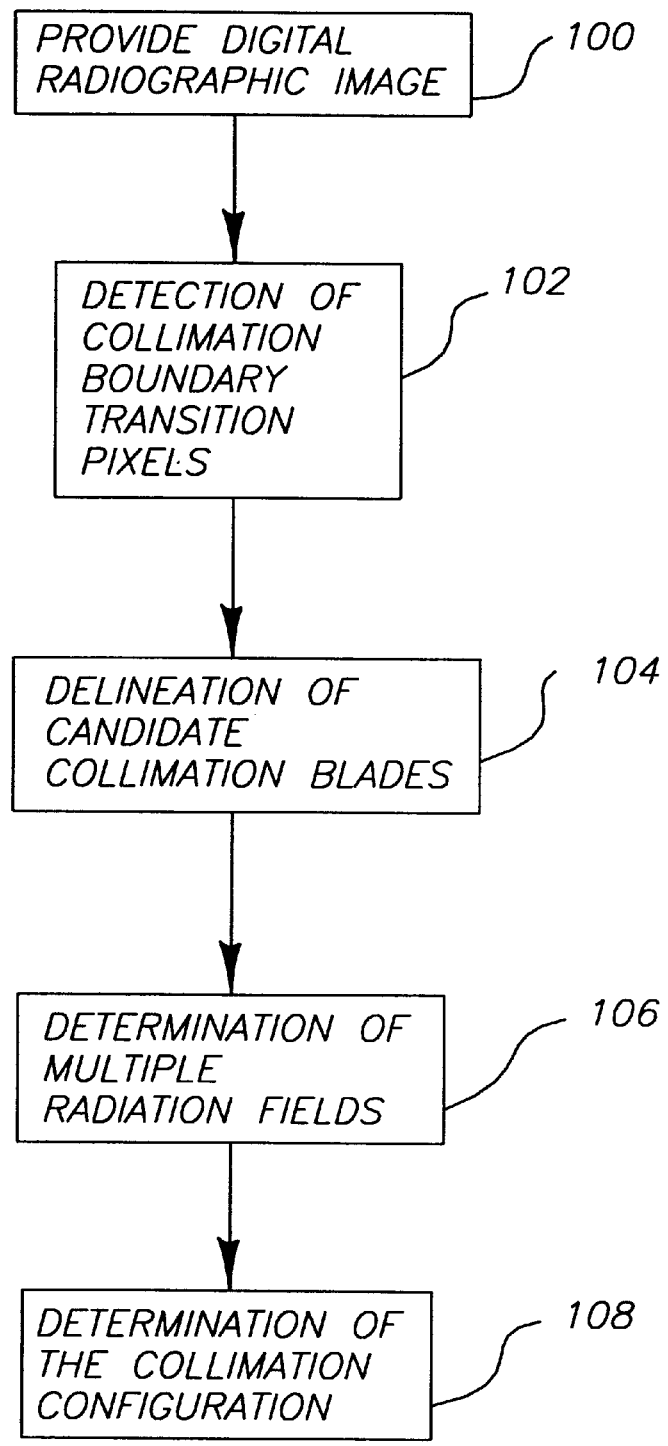
FIG. 10 is a block diagram of the method of the present invention.

In general, the present invention is a new method for the recognition of one or more radiation fields, or equivalently, detection of the collimation and partitioning (FIG. 10). Based on a priori knowledge of the collimation process, the current method consists of four major stages of operations after a digital radiographic image is provided (box 100): (1) pixel-level detection and classification of collimation boundary transition pixels (box 102); (2) line-level delineation of candidate collimation blades (box 104); (3) estimation of the most likely partitioning (box 106); and (4) region-level determination of the collimation configuration (box 108). It has been found that the edge profile of the collimation boundary and the skin line show quite distinctive characteristics. Edge profile analysis can reliably identify whether an edge pixel sits on a transition from the collimation region to the irradiation field, a skin-line (i.e., the transition from directly exposed region to tissue), or other boundary transition.

The four-stage processing is as follows. In stage 1, boundary transition pixels are detected and classified. Then, in stage 2, the boundary transition pixels are bound together to form potential collimation blades. This is accomplished using the Hough Transform (HT), robust peak detection in the HT domain and narrow-band based inspection. In stage 3, from the obtained collimation blades, partition blade pairs are extracted. A partition blade pair refers to a pair of collimation blades which can be used to partition the radiographic image into valid sub-images containing one or more irradiation fields. In order to reduce false alarms and the number of hypotheses needed to be evaluated for candidate partition blade pairs, three screening passes are conducted. Also during stage 3, candidate partition blade pairs are sorted in such an order that the multiple-expose image can be recursively and continuously partitioned into a simple sub-image and a compound sub-image. A simple sub-image contains single irradiation field and can not be further partitioned, while a compound sub-image may contain one or more irradiation fields and may be further partitioned. For each candidate partition blade pair on the sorted list, a partition hypothesis is evaluated which may result in a split of the image into a simple sub-image and a compound sub-image. Upon the completion of the evaluation of all the partition hypotheses, a plurality of simple sub-images are obtained. In the final stage, the candidate blades which belong to each simple sub-image are identified, and are assembled into collimation configurations, or regions. To improve the computational efficiency, each possible configuration is represented by a node in a decision tree which is then traversed with depth-first priority. For each node, two types of figure-of-merit are computed in terms of about a dozen of geometry FOMs and region FOMs. The overall FOM is the summation of all the applicable FOMs, which are essentially "fuzzy scores". Therefore, the top-down traversing of tree is equivalent to an evidence accumulation process. The FOM can be inherited from parent nodes to children nodes. A branch may be trimmed at the point where the FOM is already below certain threshold, as will be addressed later.

In summary, the overall scheme is built upon boundaries yet it utilizes boundary as well as region based information. A histogram-based region segmentation scheme is unlikely to perform well because the intensity distribution inside the irradiation field and the collimation region can significantly overlap with each other. Furthermore, the contrast in the image is generally poor and the shadow regions are usually not uniform. Although stage 1 is edge-oriented, the detection and classification of the boundary transition pixels are conducted within the context of the neighborhood. In stage 2, region-based properties are measured on both sides of a candidate blade. In stage 3, region-based properties are also measured between the two blades of each candidate partition blade pair. Finally, stage 4 evaluates each legitimate configuration using both edge-based and region-based FOMs. By combining both edge and region based information, we are able to achieve a high performance with high efficiency.

Figure 9:
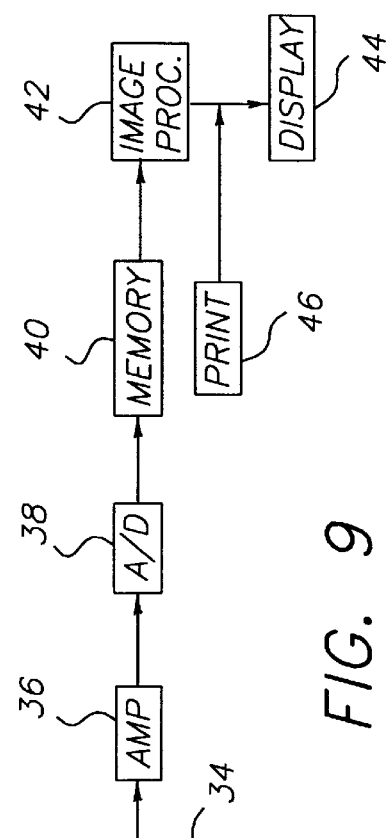
FIG. 9 is a diagrammatic view of a computed radiography system using the present invention.
Figure 9:
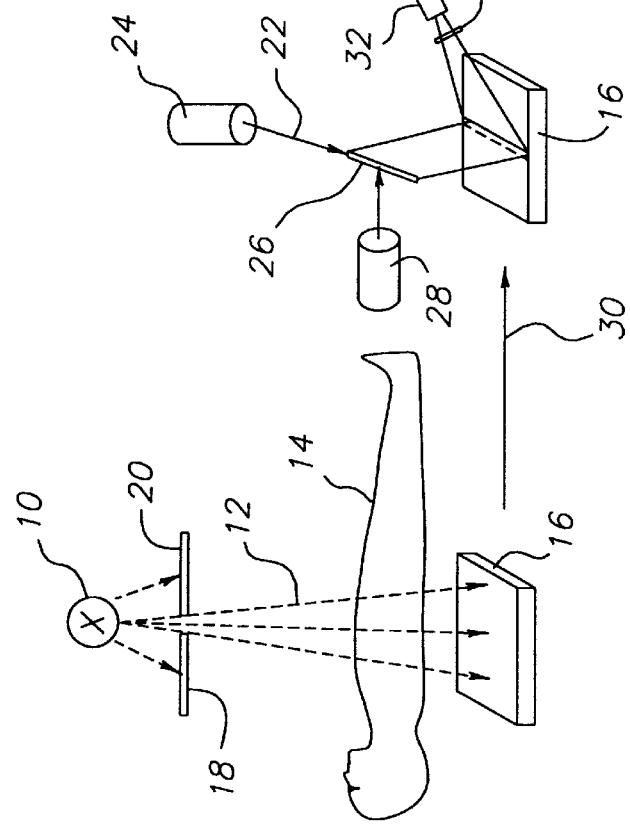

The digital image can be provided by the CR imaging system illustrated in FIG. 9. As shown, x-ray source 10 projects an x-ray beam 12 through body 14 to expose storage phosphor 16. Collimation plates 18,20 limit the x-ray beam. The storage phosphor 16 stores a latent x-ray image of the irradiated body. The exposed storage phosphor is scanned by a beam 22 of stimulating light from laser 24 by means of scanning deflector 26 driven by drive 28 in repeated line scans across phosphor 16 as it is moved in a page direction. Emitted light from phosphor 16 is detected by photodetector 32. Filter 34 filters stimulating light from detector 32. The detected signal is amplified by AMP 36, converted to a digital signal by A/D (analog-to-digital converter) 38 and stored in digital memory 40. The image is processed according to the method of the present invention in image processor 42. The processed image can be displayed on electronic display 44 or printed out on film by a printer 46.

Figure 13:
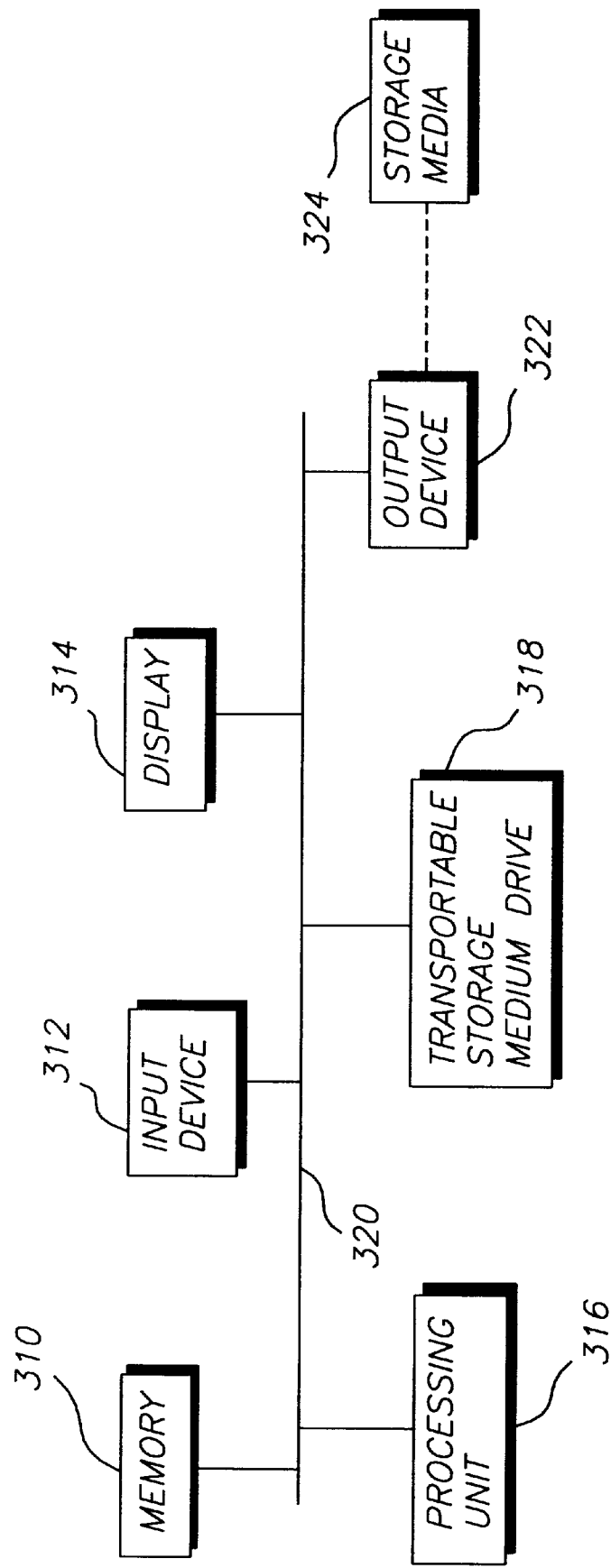
FIG. 13 is a block diagram of a digital computer useful in carrying out the present invention.

The digital image is processed in image processor 42, according to the method of the present invention. Image processor 42 can take the form of a digital computer, such as illustrated in FIG. 13. In such case, one or more of the steps of said method can be carried out using software routines. Image processor 42 can also include hardware or firmware for carrying out one or more of said method steps. Thus, the steps of the method of the invention can be carried out using software, firmware, and hardware, either alone or in any preferable combination.

As shown in FIG. 13, a digital computer 300 includes a memory 310 for storing digital images, application programs, operating system, etc. Memory 310 can include mass memory (such as a hard magnetic disc or CD ROM), and fast memory (such as RAM). Computer 30 also includes input device 312 (such as a keyboard, mouse, touch screen), display 314 (CRT monitor, LCD), central processing unit 316 (microprocessor), output device 318 (thermal printer, dot matrix printer, laser printer, ink jet printer). Components 310,312,314,316,318 are connected together by control/data bus 320. Computer 300 can include a transportable storage medium drive 322 for reading from and/or writing to transportable storage media 324, such as a floppy magnetic disk or writeable optical compact disk (CD).

As used in this application, computer readable storage medium can include, specifically, memory 310 and transportable storage medium 324. More generally, computer storage medium may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

The digital radiographic image can also be provided by other sources including: diagnostic scanning devices (CT, MRI, US, PET), direct digital radiography, film digitizers, digital image archival and storage systems, etc.

Detection and Classification of the Collimation Boundary Transition Pixels

The purpose of stage 1 is to identify the collimation boundary pixels for use in stage 2. The process used is essentially that of smart edge detection based on a classifier and a priori knowledge of the collimation process. This smart edge detection approach can have significant advantages over the use of a blind gradient based edge detection when applied to preprocessing for the Hough Transform (HT) in stage 2 in terms of minimizing the likelihood of detecting unwanted edges associated with the skin-line, hardware, and other clutter. Also, minimizing the number of pixels that need to be considered in the HT can provide an advantage in terms of computational efficiency.

The method used for stage 1 relies on a direct-exposure detection method and a skin-line detection method adapted to detect the collimation boundary rather than the skin-line.

The method performs the search for collimation boundary pixels first using a line-by-line search of each horizontal line of the image. This is followed by applying the identical process to each vertical column of the image. As the process used is independent of the orientation applied, the following will use the term line to mean either a horizontal row of pixels or a vertical column. First, after smoothing the line to minimize the impact of noise, the significant transitions (monotonically increasing or decreasing segments of pixels) are identified. The smoothing is performed with the application of a 3×1 Gaussian convolution kernel.

Figure 14A:
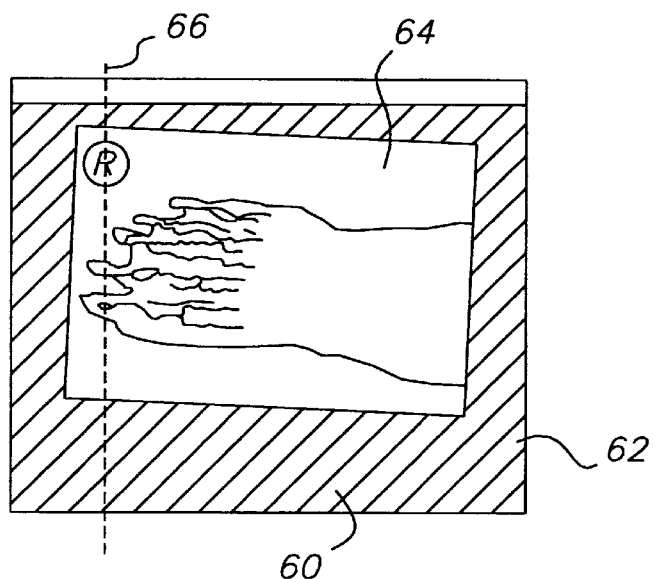
FIG. 14(a) is a diagrammatic view of a radiograph showing a radiation region and a collimation region.
Figure 14B:
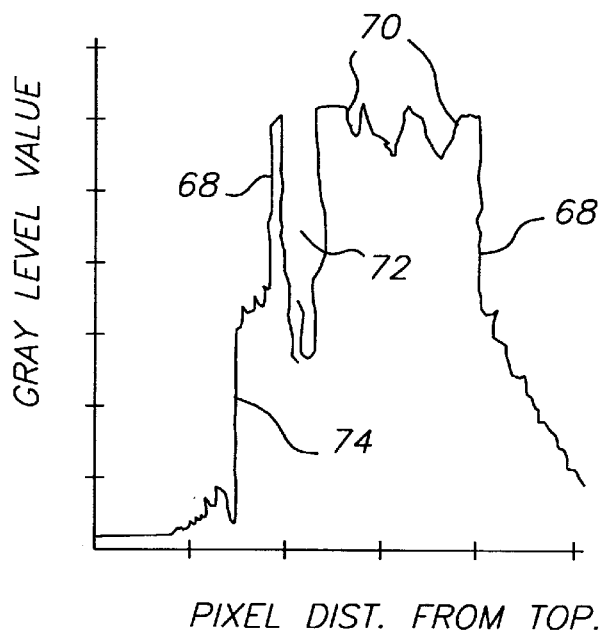
FIG. 14(b) is a graphical view of a line profile through the collimation boundary of the radiograph of FIG. 14(a).

FIG. 14(a) shows a radiograph having a radiation region 64 and a collimation region 62. FIG. 14(b) shows an example line profile and the significant transitions associated with the collimation boundaries 68, skin-line 70, clutter (the mark "R") 72, and a secondary collimation boundary 74 along the line 66 of FIG. 14(a). It has been observed that the likelihood of correct classification depends on a number of factors that will be described below. To allow stage 2 to take advantage of this knowledge, rather than output simply a binary decision regarding the likelihood of a transition being a collimation boundary, the likelihood will be quantized to one of four values. The gray level values that will be used in the map passed to stage 2 will be 0, 64, 128, and 255. However, the actual values are not significant and they can be thought of as "not likely", "low likelihood", "moderate likelihood", and "high likelihood", respectively. Note that stage 1 associates this likelihood value to a transition rather than a single pixel. To allow the detection of multiple exposure collimation or partition boundaries, all significant transitions in a line are considered (passed to the classifier). The spatial location of the "boundary pixel", for a given transition, is taken to be the pixel whose gradient across its nearest neighbors is the largest for that transition.

TABLE 1

Features computed for each transition.

| Feature | Description |
|---|---|
| 0 | transition length |
| 1 | transition range |
| 2 | transition background deviation |
| 3 | transition maximum slope |
| 4 | coeff. of $x^2$ of Eq. (1), i.e. A |
| 5 | coeff. of $x * y$ of Eq. (1), i.e., B |
| 6 | coeff. of $y^2$ of Eq. (1), i.e. C |
| 7 | coeff. of $x$ of Eq. (1), i.e. D |
| 8 | coeff. of $y$ of Eq. (1), i.e. E |
| 9 | sum of squared errors of the model fit |

The process used to classify each transition depends on the availability of a direct-exposure estimate. If direct-exposure is detected a two pass approach is used. In the first pass the method uses the classifier of the skin-line detection process to identify direct exposure-collimation boundary transitions. This classification process involves the computation of a set of features shown in Table 1. A least mean square (LMS) error fit, of a general quadratic model as given in Equation (1), to the transition in question is performed. Computation of the features is followed by application of a Gaussian maximum likelihood classifier. Since the boundary transitions found in this first pass are the most reliable, the pixels associated with the maximum gradient of these transitions are labeled with a count of 255 ("high likelihood"), which corresponds to a collimation-direct exposure, or foreground-background (ater referred to as F/B), transition. The results of this first pass (in both orientations) are also used to establish an estimate of the maximum gray level of the collimation using the histogram of the beginning points of the direct exposure-collimation boundary transitions. Note that the beginning point generally falls well within the collimation region which make for a better estimate than the boundary pixel. To minimize sensitivity to classifier errors, only the first collimation boundary transition detected from the ends of each line is used for this collimation gray level estimate, since the false alarm rate for these is significantly lower than for interior boundaries. Also, rather than the absolute maximum gray level, the gray level of the first histogram bin from the right whose population exceeds some threshold number of pixels is used as the estimate of the maxima. This collimation (foreground) grey level estimate will be used by the second pass to help identify tissue-collimation boundary transitions.

$$A*x^2+B*xy+C*y^2+D*x+E*y+1=0 \quad (1)$$

If a sufficient number of collimation/direct-exposure pixels are identified to get a robust estimate of the collimation gray level maxima, then a second pass through the image is used in an attempt to identify collimation-tissue boundaries given the collimation gray level maxima. For many exam types the collimation-tissue boundary transition will span the collimation maxima established as described above. However, for some more dense body parts (e.g., pelvis, shoulder, etc.) the gray level of the tissue region near the boundary may be below that of the collimation gray level maxima, that is, the gray level of the tissue region may fall below some of the "unexposed" area of the collimation. One contributing factor to this is the close proximity of the body to the film/storage phosphor plate which minimizes the scatter reaching the plate behind the tissue. Recall that the collimation blades are farther from the plate (near the source) allowing more opportunity for radiation scattering fogging of the plate in the collimation region. Therefore, we require that the beginning of the transition (in the potential collimation region) be less than the collimation gray level maxima. However, the ending point of the transition (the potential tissue region) only has to exceed some predefined ratio (SPAN_RATIO$\leq$1) of the collimation gray level maxima. In addition to this "spanning" test a transition is only labeled as a collimation boundary transition if the range of the transition (i.e., the gray level difference from beginning to end) exceeds some threshold MIN_RANGE and the maximum gradient along the transition exceeds some threshold MIN_GRADIENT. Upon passing these three tests ("spanning", range, and gradient), the transition is labeled as a "moderate likelihood" (code 128) collimation boundary, which corresponds to a collimation-tissue, or foreground-tissue Oater referred to as FPF), transition.

If no direct-exposure area is found or an insufficient number of collimation-direct-exposure pixels are found to establish an estimate of the collimation gray level maxima, only the range and gradient tests described above are performed. Note that this collimation boundary classifier has degraded to a threshold on the gradient after removing those candidates that didn't pass the range test. This approach is not as reliable as the cases when estimates are available for the direct-exposure and collimation gray levels. Therefore, these transitions are labeled only as "low likelihood" (code 64) boundary transitions, which correspond to other significant (later referred to as O/T) transitions. Any transitions not passing the tests described above are labeled as "not likely" (code 0) to be a collimation boundary transition. Note that this worst case scenario (no direct-exposure and hence no collimation gray level knowledge) is still marginally better than the traditional approach of using a gradient operator followed by thresholding as the preprocessing to the Hough transform. In our case, at least some transitions associated with clutter in the collimation region as well as those associated with internal body structure (e.g., bones) can be eliminated due to their limited range.

Delineation of Candidate Collimation Blades

After the boundary transition pixels corresponding to potential collimation blades are detected and classified with respect to the confidence of these pixels, the task of stage 2 is to form line structures which will constitute the collimation blades and partition blade pairs. This is one of two intermediate stages of this invention which work on both line-level and region-level based measures and figures-of-merit.

The delineation of the candidate collimation blades is accomplished as follows.

First, the Hough Transform (IT) is performed on the boundary transition pixels in the boundary label image. In the boundary label image, a nonzero pixel will make contributions to the accumulation array in the HT. Typically due to the boundary analysis and classification in stage 1, there are a total of 1–2% nonzero edge pixels in the boundary label image, regardless of the transition type. A twisted HT is used to facilitate the peak detection process at the borders of the HT plane. The sampling step sizes used for HT, i.e., d$\rho$ and d$\theta$, are optimized based on the requirement of the minimal resolution for detecting the collimation blades.

Second, all peaks within a local window whose bin-occupancies are greater than a predefined threshold in the twisted HT domain are identified. The peaks are sorted based on their bin-occupancies and only the first pre-selected number of peaks are recorded for further analysis.

Third, perform a narrow-band inspection of each line as defined by its corresponding peak (ρ, θ) in the HT domain. Small gaps within each line will be neglected, however, large gaps will be used to segment the line into a group of candidate collimation blades. Each collimation blade must be longer than a predefined length to receive further consideration.

Figure 2:
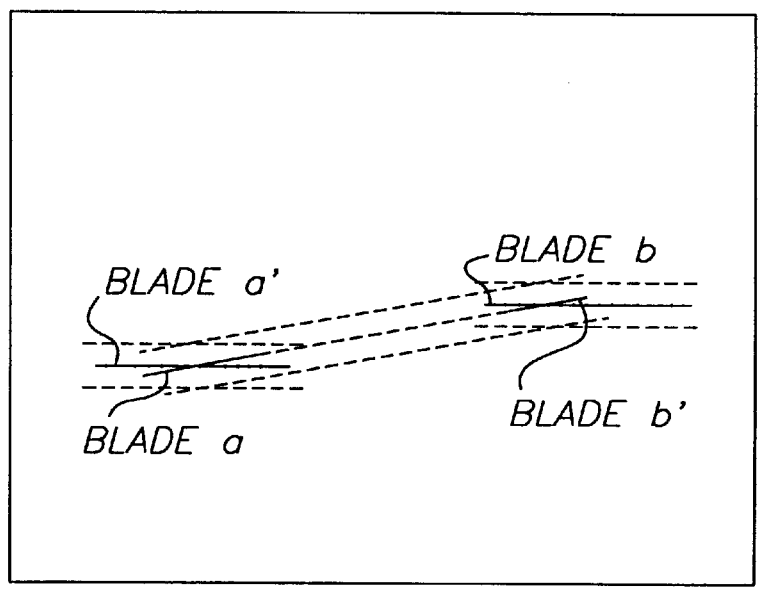
FIG. 2 is an illustration of a secondary blade. Blade a' and blade b' are the secondary blades of blade a and blade b, respectively.

Fourth, secondary collimation blades are detected and eliminated. FIG. 2 illustrates secondary blades a', b' of blades a,b, respectively. A secondary blade usually shares some common boundary transition pixels within its narrow band with other blades. It does not facilitate the analysis of either the collimation blades or partition blade pairs. Rather, it causes false alarms and increases computational time. Secondary peaks in the HT domain usually result in such secondary blades. However, if a "butterfly" filtering is performed in the HT domain before peak detection, the number of secondary peaks can be reduced. A suggested "butterfly" filter is shown below:

$$\begin{bmatrix} 0 & -2 & 0 \\ 1 & 3 & 1 \\ 0 & -2 & 0 \end{bmatrix}$$

To determine if a collimation blade is a secondary blade of the other, a rule-based decision making process is performed based on several measures, including blade_length and blade_variance. The measure blade_length of a collimation blade is defined as the distance between its two ending points, i.e., $$\text{blade\_length} = \sqrt{(x_f - x_i)^2 + (y_f - y_i)^2} \; ; \quad (2)$$

and the measure blade_variance is defined as the mean-square-error of the positions of the boundary transition pixels within the narrow band of the blade from their expected values, i.e., $$\text{blade\_variance} = \begin{cases} \sqrt{\frac{1}{N}\sum_{i=1}^{N}[(\rho - x_i\cos\theta)/\sin\theta - y_i]^2} & \text{for } |\theta| \in [0, \frac{\pi}{4}], \\ \sqrt{\frac{1}{N}\sum_{i=1}^{N}[(\rho - y_i\sin\theta)/\cos\theta - x_i]^2} & \text{for } |\theta| \in (\frac{\pi}{4}, \frac{\pi}{2}]. \end{cases} \quad (3)$$

In particular, a blade is named as a secondary blade and will be deleted if its two ending points are too close to those of another blade and its blade_variance is the larger between the two blades, it shares more common boundary transition pixels than a predefined threshold with another blade, either its blade_variance is the larger when its blade_length is within one half to twice the length of the other blade, or its blade_length is shorter than the half length of the other blade.

Finally, the last step in the delineation process of the collimation blades is to calculate the goodness, hit-percentage, completeness and polarity of each blade, and to delete blades of fairly low goodness, low hit-percentage, or high blade variance. A measure blade_goodness is defined as the sum of the weighted boundary transitional pixels normalized by its projected length, i.e., $$\text{blade\_goodness} = \frac{FBnum \times 1.0 + FTnum \times 0.5 + OTnum \times 0.25}{plen} \quad (4)$$

where FBnum, FTnum and OTnum are the total number of transitional pixels of foreground to background, foreground to tissue/bone, and other types found within the narrow band of the blade, respectively. The measure plen is defined as the projected length of the blade between its starting to ending points assuming that the blade is perfectly connective, without a gap, and without any jaggedness, i.e., $$plen = \begin{cases} |y_f - y_i| & \text{for } |\theta| \in [0, \frac{\pi}{4}], \\ |x_f - x_i| & \text{for } |\theta| \in (\frac{\pi}{4}, \frac{\pi}{2}]. \end{cases} \quad (5)$$

A measure hit_percentage is defined as the sum of the boundary transition pixels within the narrow band normalized by plen, i.e., $$\text{hit\_percentage} = \frac{FBnum + FTnum + OTnum}{plen} \quad (6)$$

Figure 3:
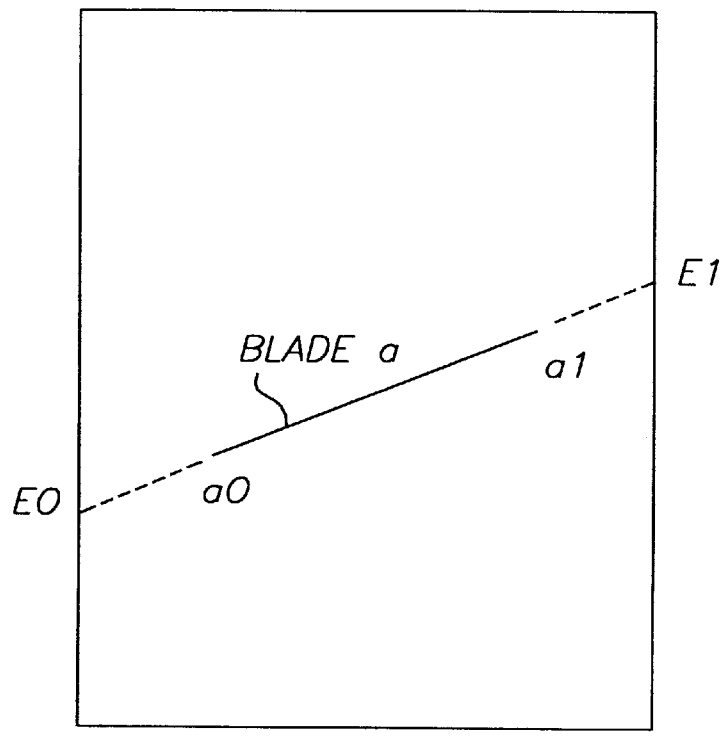
FIG. 3 is an illustration of the definition of blade__completeness.
Figure 4:
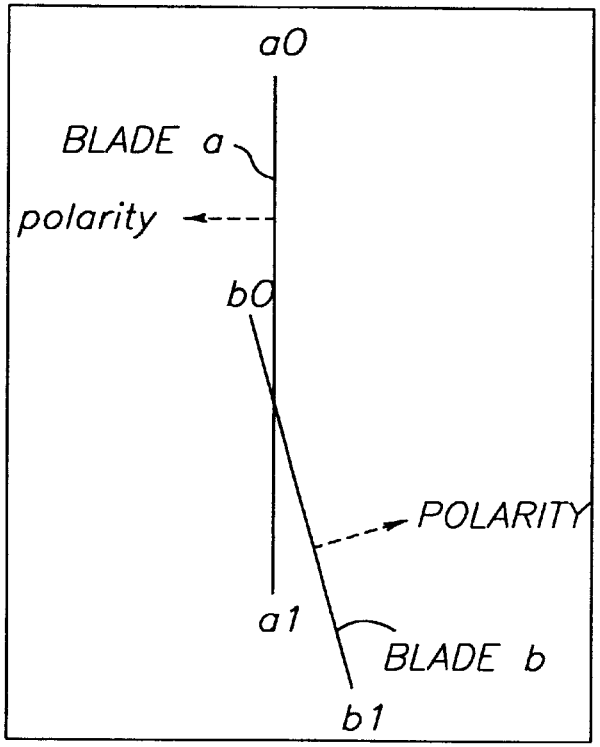
FIG. 4 is an illustration of the definition of bld2__polarity.

A measure blade_polarity (FIG. 4) is defined as the transition direction from low intensity to high intensity across the blade examined along the direction of the blade. Blade_polarity=+1 if the angle between such transition direction and either positive axis, +x or +y, is no greater than 45°; or blade_polarity=−1 otherwise. A measure blade_completeness (FIG. 3) is defined as the ratio between the length of the blade and the length of the extended blade. The two ending points of the extended blade are the intersections between the image boundaries and the blade to be investigated.

$$\text{blade\_completeness} = \frac{|a1 - a0|}{|E1 - E0|} \quad (7)$$

Determination of Multiple Irradiation Fields

Figure 1A:
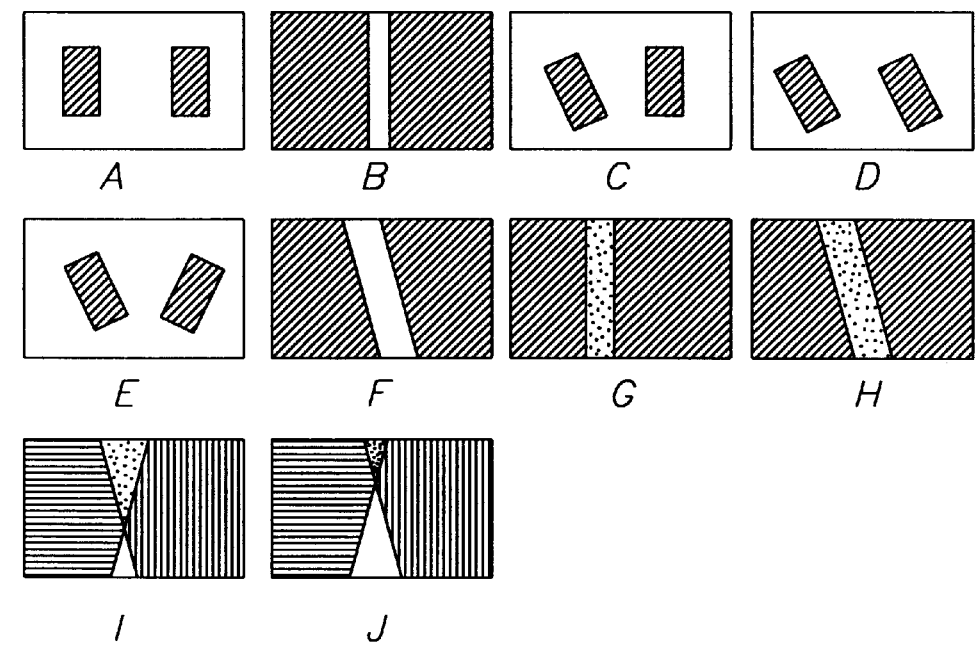
FIGS. 1(a) and 1(b) are a graphic illustrations of a few multiple-exposure configurations that can be properly handled by the present invention.
Figure 1B:
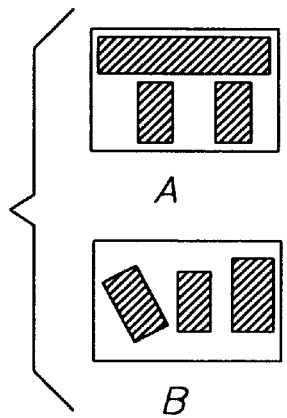

For a CR image that consists of two or more radiation fields, it can be classified based on the spatial layout of the radiation fields into one of the three categories: disconnected, overlapping and touching irradiation fields. The signature of disconnected irradiation fields, as shown in FIG. 1(a)[A–F] and FIG. 1(b), is that there is no spatial overlapping between the individual radiation fields. The overlapping irradiation fields, as shown in FIG. 1(a)[G–J], are those whose individual irradiation fields partially overlapped with each other. The signature of the touching irradiation fields is that the individual irradiation fields perfectly touches each other. The algorithm of this stage tries to identify all the legitimate partition blade pairs. Such a pair consists of two collimation blades that belong to two radiation fields and can be used to segment the CR image into two sub-images, i.e., a simple sub-image and a compound sub-image. Each of the individual simple sub-images will then contain only one single radiation field. However, this algorithm will treat images with touching irradiation fields as single-expose images, and it generates a smallest optimal collimation boundary for such an image using the process described in stage 4.

This stage finds all the candidate partition blade pairs, segments the image into simple sub-images, collects only those legitimate collimation blades which belong to different individual image partition, and eventually pass these collimation blades and their associated properties to stage 4 for collimation configuration analysis. Therefore only a limited number of candidate blades will be passed from stage 3 to stage 4 so that not only is the computation burden of stage 4, i.e., the total number of possible collimation configurations, significantly reduced, but the overall performance of the irradiation field recognition can also be greatly improved. In summary, the major steps of processes in stage 3 are (1) to identify partition blade pairs, (2) to sort partition blade pairs in order to partition the CR image continuously and recursively, (3) to partition the image based on the partition blade pairs, and (4) to identify all the collimation blades that belong to each image partition (sub-image).

Identification of Partition Blade Pairs

Three passes of steps are involved in finding the candidate partition blade pairs. The first pass is a process of rule-based decision to identify all the possible combinations of candidate collimation blades that can construct partition blade pairs. The second pass is a process of fuzzy score-based evidence accumulation to rank the likelihood of the candidate partition blade pairs. The third pass is a partition inspection process that selects only the best partition blade pairs among a group of related partition blade pairs.

In this first pass, two collimation blades are registered as a candidate partition blade pair if their intersection angle is less than a predefined value (parallel blades would be the ideal), and their single-blade polarities are opposite to each other.

At the end of the first pass, a process is performed to eliminate the redundancy in the candidate partition blade pairs. In particular, if two partition blade pairs, e.g., (A,B) and (A,C), share the same collimation blade A, and, B and C are linearly coherent and their polarities are consistent, these two pairs are merged into one.

Figure 5:
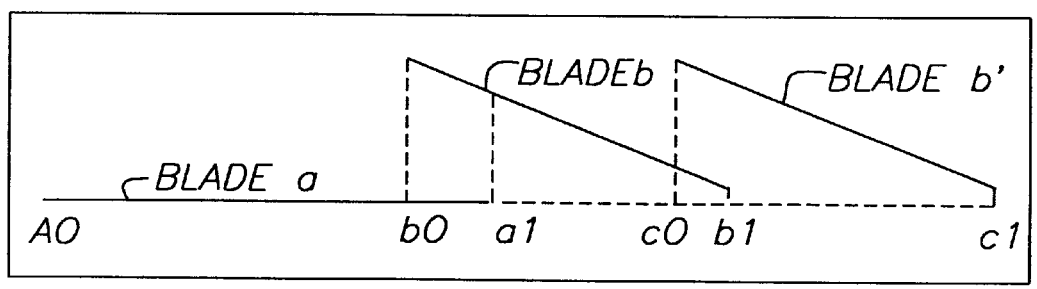
FIG. 5 is an illustration of the definition of fom__projection.

Further analysis of the partition blade pairs is performed during the second pass, which is a combined process of figure-of-merit based evidence accumulation and fuzzy score-based decision making. A set of figures-of-merit of each candidate partition blade pair are calculated, which include fom_projection, fom_rlen, fom_centrality, fom_completeness, fom_parallel, fom_distance and fom_pblade.

fom_projection (FIG. 5)

The measure fom_projection of blade b with respect to blade a in a partition blade pair, is defined as the ratio between the length of the line segment, which is the overlapping part of blade a and the projection of blade b on blade a, and the projected length of blade b on blade a. In particular, if the overlap between blade a and the projection of blade b on blade a is nonzero, as shown in FIG. 5, then fom_projection is defined as $$fom\_projection = +\frac{|a1 - b0|}{|b1 - b0|}, \quad (8)$$

which varies from 0.0 to 1.0; however, if there is no overlap, fom_projection is defined as the ratio between the distance of the two nearest ending points of blade a and the projection of blade b' on blade a, and the projected length of blade b' on blade a, as shown in FIG. 5, $$fom\_projection = -\frac{c0 - a1}{c1 - c0} \quad (9)$$

which is always less than zero. A partition blade pair whose blades are present next to each other would be encouraged by this FOM.

fom_rlen

Figure 6:
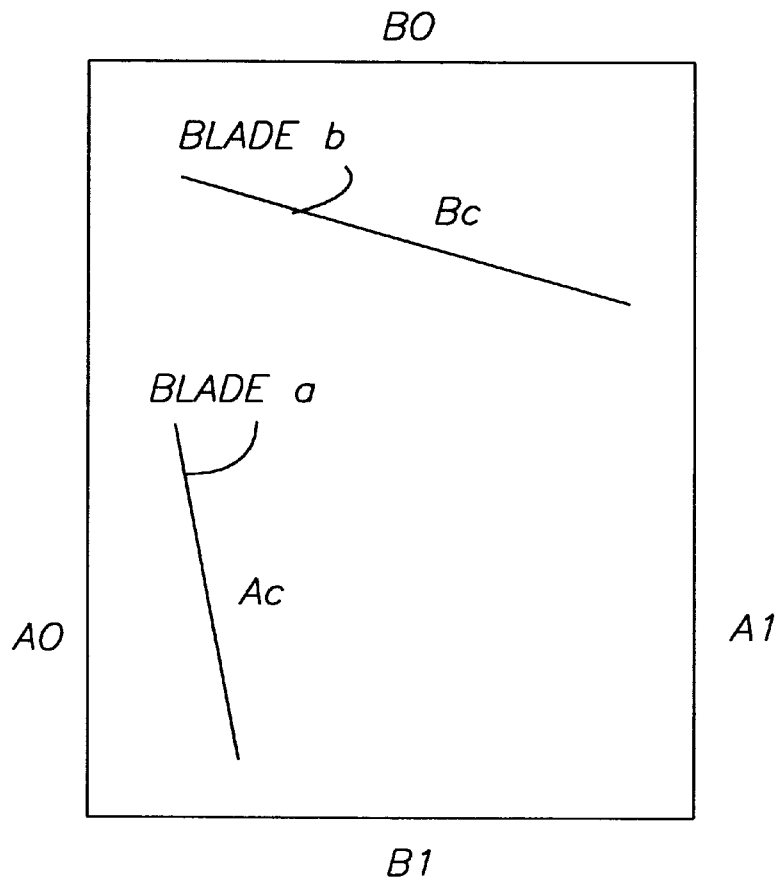
FIG. 6 is an illustration of the definition of from__centrality.

The measure fom_rlen of a partition blade pair, blade a and blade b, is defined as the ratio of the length of the shorter blade to the length of the longer blade between blade a and blade b, i.e., $$fom\_rlen = \frac{\min(blade\_length_a, blade\_length_b)}{\max(blade\_length_a, blade\_length_b)} \quad (10)$$

which is always greater than 0.0 but less than 1.0. A blade pair whose lengths are comparable would be encouraged by this FOM.

fom_centrality (FIG. 6)

The measure fom_centrality of a blade is defined as the ratio of the lengths of two line segments, both of which go through the center of the blade and are parallel to one boundary of the image depending on the orientation of the blade. The ratio is taken as the length of the shorter line segment to the length of the longer line segment. In specific, for blade a, $$fom\_centrality = \frac{\min(|Ac - A0|, |A1 - Ac|)}{\max(|Ac - A0|, |A1 - Ac|)}, \quad (11)$$

which varies from 0.0 to 1.0. This FOM is used to encourage partition blades that are close to the center of the image in at least one direction.

fom_completeness

Figure 7:
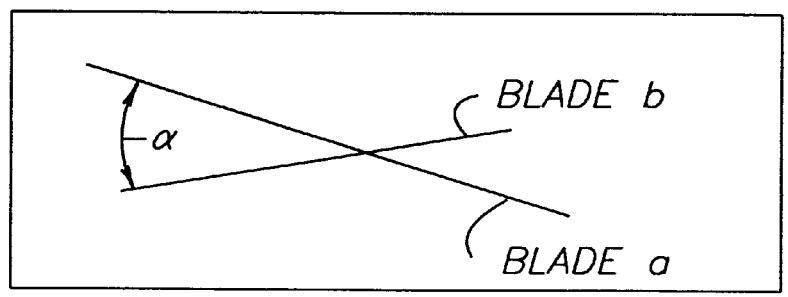
FIG. 7 is an illustration of the definition of from__parallel.

The measure fom_completeness of a partition blade pair, blade a and blade b, is defined as the sum of the completeness of blade a and blade b, i.e., $$fom\_completeness = blade\_completeness_a + blade\_completeness_b, \quad (12)$$

which varies from 0.0 to 2.0. This FOM encourages partition blade pairs consisting of longer blades.

fom_parallel (FIG. 7)

The measure fom_parallel of a partition blade pair, is related to the intersection angle α between its two blades:

$$fom\_parallel = 1.0 - \frac{\alpha}{\pi/4.0} \quad \text{where } a \in \left[0, \frac{\pi}{2}\right], \quad (13)$$

A blade pair consisting of parallel blades has a higher fom_parallel and is encouraged.

* fom_distance

Figure 8:
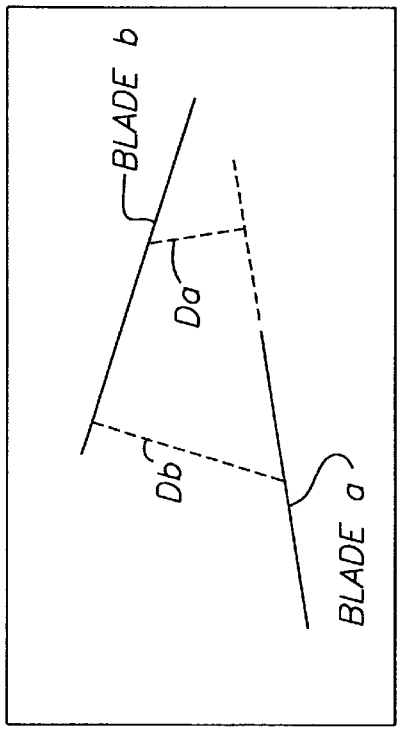
FIG. 8 is an illustration of the definition of bld2__distance.

To define the measure fom_distance of a partition blade pair, blade a and blade b, the distance between the two blades, bld2_distance(a,b), should be explained first. The measure bld2_distance(a,b) is defined as the shortest distance from the center of one blade to the other blade (FIG. 8):

$$bld2\_distance = \min(Da, Db). \quad (14)$$

Based on this, fom_distance is defined as $$fom\_distance = \begin{cases} 1.0 - \frac{bld2\_distance(a, b)}{nrows \times 2.0} & \text{for } |\theta| \in \left[0, \frac{\pi}{4}\right], \\ 1.0 - \frac{bld2\_distance(a, b)}{ncols \times 2.0} & \text{for } |\theta| \in \left[\frac{\pi}{4}, \frac{\pi}{2}\right], \end{cases} \quad (15)$$

where ncols and nrows are the dimensions of the image. This FOM encourages partition blade pairs whose two blades are close to each other.

Finally, fom_pblade is defined as the weighted sum of several of the above mentioned figures-of-merit, which is an overall measure of the figures-of-merit. In particular, $$fom\_pblade = fom\_parallel + fom\_distance + fom\_completeness. \quad (16)$$

Decisions are then made based on the calculated figures-of-merit. A partition blade pair is deleted from the candidate list if

- the fom_centrality of either of the two blades is less than a predefined threshold, or
- its fom_rlen is larger than a predefined threshold, or
- the fom_projection of either of the two blades is greater than a predefined threshold, or
- its fom_completeness is smaller than a predefined threshold, or fom_completeness is within a certain range but the sum of blade_goodness of the two corresponding blades is smaller than a predefined threshold, or
- its fom_pblade is smaller than a predefined threshold, or
- significant background pixels or boundary transition pixels are found within the gap between the partition blade pair in the cases of disconnected and minor overlapping irradiation fields, or no significant background pixels are found within the gap in the cases of major overlapping irradiation fields.

Minor or major overlapping irradiation fields can be best explained as follows. First the majority of a blade relative to the other blade should be defined. As in FIG. 4, the polarities and ending points of both blade a and blade b of one partition blade pair, are all indicated. Blade a and blade b intersect at point c, and the majority of blade b relative to blade a is defined as the longer segment between c-b0 and c-b1. If the majority of one blade is on the inner side relative to the other blade according to the polarity of the other blade, such cases are named major overlapping irradiation fields, as shown in FIG. 1[G–I], or minor overlapping irradiation fields otherwise, as shown in FIG. 1[J].

In summary, a partition blade pair (i) should not be too close to the image borders, (ii) should have comparable lengths, (iii) should be present next to each other, (iv) should be well composed; (v) should not too far apart relative to the dimensions of the image; (vi) should have the majority of each blade on the outer side relative to the other blade according to the polarity of the other blade in the cases of disconnected and minor overlapping radiation fields, or should have the majority of one blade on the inner side relative to the other blade according to the polarity of the other blade in the case of major overlapping radiation fields; (vii) have fairly good overall combined figure-of-merit based on their parallelism, distance, and their extent relative to the dimensions of said radiographic image; and (viii) should have no significant direct exposure region or modulated region within the gap formed by the candidate partition blade pair in the cases of disconnected and minor overlapping radiation fields, or should have significant direct exposure region within the gap in the cases of major overlapping radiation fields.

Upon the second pass, the third pass is performed to select only the best pair, in terms of the largest overall combined figure-of-merit (fom_parallel+fom_pblade), among those that share a common partition blade. The reason to add fom_parallel to fom_pblade as the overall combined FOMs is to encourage more parallel blades among the partition blade pairs. Also in the third pass, if two pairs are too close to each other, only the better pair, in terms of the largest overall combined figure-of-merit, is selected. Furthermore, both pairs are rejected if majority of either of the blades in either pair falls within the gap formed by extending the candidate blades of the other pair to the borders of the radiographic image or the compound image, whichever applies. Also, only the inner pair is retained if majority of both of the blades in either pair falls within the gap formed by extending the candidate blades of the other pair to the borders of the radiographic image or compound image, whichever applies.

Sorting of the Partition Blade Pairs

The purpose of this sorting process is to guarantee that the CR image under investigation can be partitioned continuously and recursively in the order as defined by the partition blade pairs. The partition blade pairs are sorted such that (a) all the remaining partition blade pairs are on the same side of the pair being examined, and (b) the pair being examined has the highest possible figure-of-merit (fom_pblade).

Image Partitioning

A CR image will be partitioned using the first legitimate partition blade pair in the list into two halves, the simple half and the complex half. The partitioning process is repeated for the compound sub-image(s) using the remaining legitimate partition blade pairs. To reduce the false alarms caused by illegitimate partition blade pairs, the two blades of the partition blade pair are extended to the borders of the original CR image or compound sub-image before each corresponding partition process. A region-based inspection of the background and boundary transitional pixels within the gap between the two extended blades is performed, and the partition blade pair is deleted if significant pixels are found in cases of disconnected and minor overlapping irradiation fields, or if no significant background pixels are found in cases of major overlapping irradiation fields.

If no legitimate partition blade pairs are found after the above mentioned process, the original CR image is considered to be consisting of only single-exposure irradiation field, including a true single-exposure irradiation field and touching multiple-exposure irradiation fields, the image can be treated as a special case of the disconnected irradiation fields. Therefore, the algorithm described in the invention, although is designed for multiple-exposure CR images, can also deal with single-exposure ones.

After the image is partitioned and each partition is a simple sub-image, the collimation blades obtained from stage 2 will be examined and identified for each image partition. Collimation blades that successfully passed the legitimacy inspection will be output to the collimation detection process on stage 4, to find the best collimation configuration. Several measures, such as bkgr_behind, edge_behind, and blade_behind, etc., are utilized to check the legitimacy of each collimation blade. The definitions of these measures are:

$$bkgr\_behind = \frac{total\ number\ of\ background\ pixels\ behind}{bld\_goodness + bld\_completeness} \times 0.5, \quad (17)$$

$$edge\_behind = \frac{total\ number\ of\ edge\ pixels\ behind}{bld\_goodness + bld\_completeness} \times 0.5, \quad (18)$$

and $$bld\_behind = \frac{bld\_goodness + bld\_comleteness}{(bld\_goodness + bld\_completeness)_{behind}}, \quad (19)$$

where behind refers to the half plane of the image which is on the side of the collimation shadow according to the polarity of the collimation blade. Since the background or direct exposure pixels should be completely enclosed inside the irradiation field, using bkgr_behind can eliminate those collimation blades if a predefined threshold is reached. Both edge_behind and blade_behind are good indicators of the modulation or edge content behind the hypothetical collimation blade. Using the sum of bld_goodness +bld_completeness as the denominator can greatly improve the robustness of the inspection process, because (1) bld_goodness and bld_completeness are found to be equally important, (2) it is unreasonable to reject a solid collimation blade simply due to some weak modulation (possibly caused by x-ray scattering), and (3) it is unreasonable to allow significant weak modulation behind a weak collimation blade.

The output of stage 3 is, for each sub-image, a list of collimation blade candidates and their associated properties, including the angle (ranging 0 to $2\pi$ in order to code the polarity), the offset, the starting and the ending points, the composition (FBnum, FTnum and OTnum), and the goodness of the blade.

Determination of the Collimation Configuration

As the final stage, stage 4 determines the most likely collimation configuration using the candidate collimation blades. Auxiliary information such as the background map, a "modulation" map, and the original image is also useful to improve the robustness of the process. In terms of the level of processing, this stage is at the highest level, i.e., region-based level. Due to the novel design of the method, in particular the pixel-level filtering in stage 1 and the line-level (or more precisely, step-edge level) filtering in stage 2, the number of false positive blades has been significantly minimized. Therefore, it is possible to develop a computationally efficient method at this stage to achieve reliable, flexible and efficient determination of the collimation configuration. Stage 4 assumes that there is only one radiation field in the current image or sub-image, whichever applies.

Figure 11:
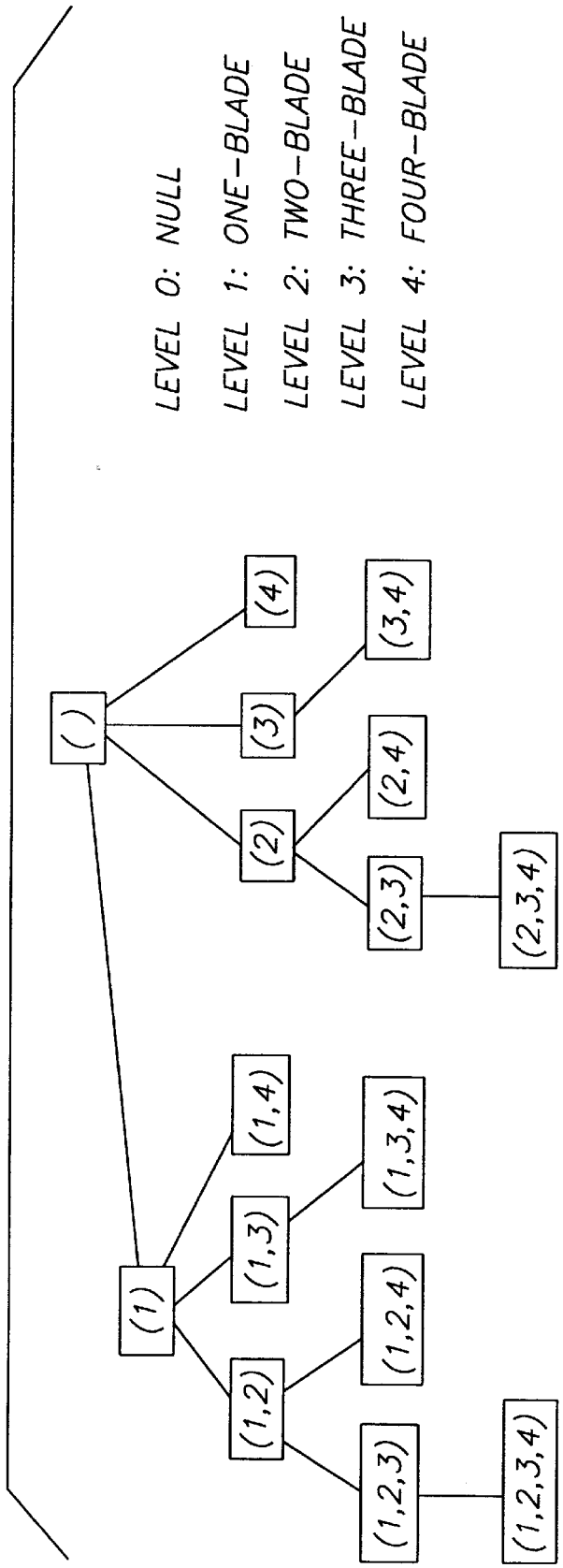
FIG. 11 is a diagrammatic view of the depth-first tree-structured hypothesis test.
Figure 12A:
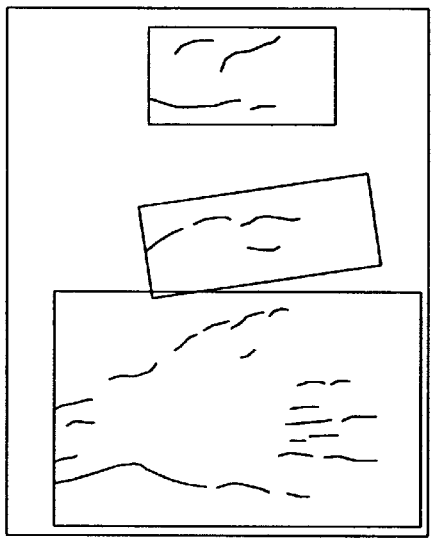
FIGS. 12(a)–12(d) are diagrammatic views of an original x-ray image, boundary transition pixels, collimation blades and partition blade pairs, and final x-ray image after irradiation field detection.
Figure 12D:
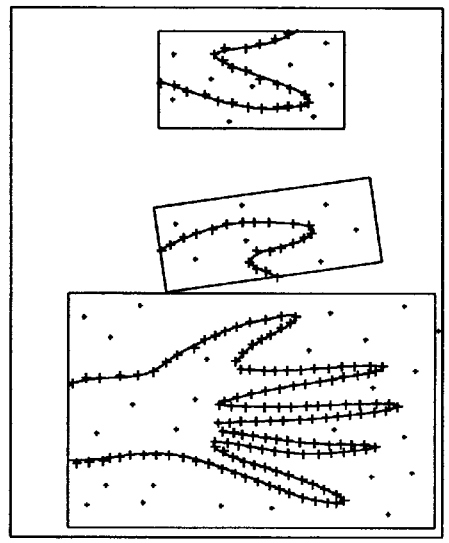
Figure 12B:
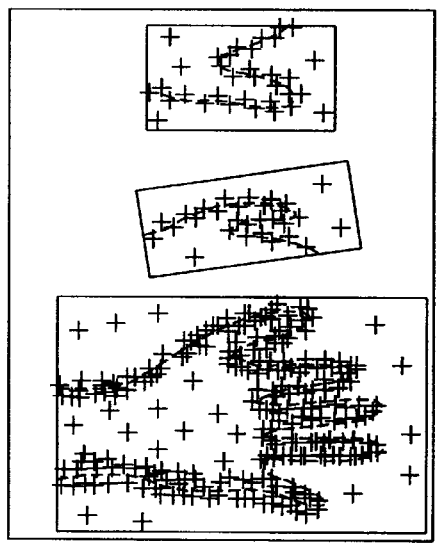
Figure 12C:
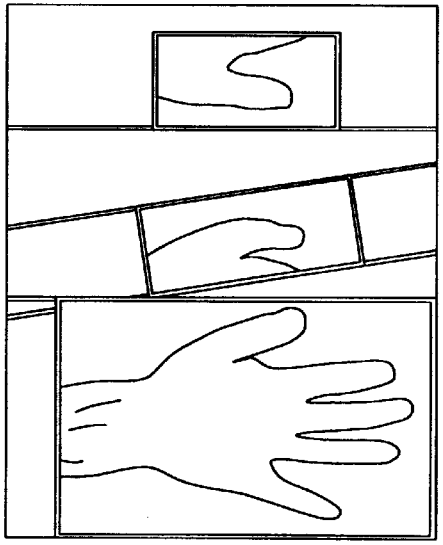

Stage 4 is designed as the following. At first, the candidate collimation blades from stage 3 are ranked with respect to their goodness measures. Then, each possible combination (not permutation!) of the candidate blades is represented by a node in a hypothesis test tree as illustrated in FIG. 11. The root node of the tree corresponds to NULL hypothesis, i.e., no collimation hypothesis. There are a total of N level-1 nodes if there are N candidate collimation blades, with each level-1 node represent a hypothetical one-side collimation. level-2 consists of nodes representing two-side hypotheses. Similarly, nodes at level-3 correspond to three-side collimation hypotheses. If only collimation configurations with up to four sides are considered, the tree does not grow beyond level-4. However, such a tree-structured scheme allows collimation with arbitrary number of blades with possible changes in the definitions of some FOMs. For example, if a hexagonal collimation is assumed, the FOM regarding orthogonality no longer applies and hence should be changed appropriately. Note that if the radiographic image is a multiple-exposure image, the scenario is slightly different. For a separated simple sub-image, one of the candidate collimation blades has already been used as the partition blade. In other words, the final collimation configuration definitely includes the partition blade. Therefore, a 3-level tree is adequate collimation configurations with up to four sides. Consequently, with the removal of the bottom level, the computation efficiency is improved without loss of performance. Note that some figures-of-merit, e.g., orthogonality, parallelism, will need to be computed with respect to the partition blade in order to raise the overall confidence.

Next, the hypothesis test tree is traversed in a depth-first fashion, equivalent to a systematic evaluation of the possible collimation configurations. The depth-first traversing is to utilize the ranking of blades to achieve efficient computation. In this way, only good hypotheses are extended further to include more collimation blades. In other words, the method always gives priority to those hypotheses with better and more blades. On the other hand, a branch can be trimmed from a certain node down such that all the descendent nodes are ignored from the evaluation, if this node has already been penalized by at least one HUGE_PENALTY because adding more blades with lower goodness values can not recover such a HUGE_PENALTY. The only exception is given if the only HUGE_PENALTY comes from the evaluation of the aspect ratio, which can be changed favorably by adding more blades to the hypothesis. Finally, the hypothesis with highest figure-of-merit above a predefined threshold is chosen to be the estimation of the collimation after subject to a verification process.

Each legitimate combination is assigned a figure-of-merit based on geometric and spatial properties consistent with the collimation process model. These properties, i.e., figures-of-merit (FOMs), are listed as follows:

Geometry-oriented FOMs 1. orthogonality: piecewise continuous; orthogonality of member blades $$\text{orthogonality} = \begin{cases} \sin(\theta_1 - \theta_2) & \text{if } \left[\frac{\pi}{2} - (\theta_1 - \theta_2)\right] < \text{SMALL\_ANGLE} \\ \text{PENALTY} & \text{otherwise} \end{cases} \quad (20)$$

where $\theta_1$ and $\theta_2$ are the angles of the individual blades.

2. parallelism: piecewise continuous; parallelism of member blades $$\text{parallelism} = \qquad (21)$$
$$\begin{cases} \cos[\theta_1 - \theta_2 - \pi] & \text{if } (\theta_1 - \theta_2 - \pi) < \text{SMALL\_ANGLE} \\ \text{HUGE\_PENALTY} & \text{if } (\theta_1 - \theta_2) < \text{SMALL\_ANGLE} \\ 0 & \text{otherwise} \end{cases}$$

where $\theta_1$ and $\theta_2$ are the angles of the individual blades, and HUGE_PENALTY is used to forbid a combination with two parallel blades with the same polarity.

3. convexity: convexity is by default always 1.0 because of the way collimation hypothesis is constructed. It is guaranteed that a polygon enclosed by half-planes (instead of lines) is always convex.

4. aspect: piecewise continuous; based on the aspect ratio of the hypothetical radiation field $$\text{aspect} = \begin{cases} \dfrac{\text{height of the bounding rectangle}}{\text{width of the bounding rectangle}} & \text{if the ratio} < \text{GOOD\_ASPECT} \\ \text{HUGE\_PENALTY} & \text{otherwise} \end{cases} \quad (22)$$

where the height is taken as the longer side, independent of the orientation, of the bounding rectangle that is oriented along with the hypothetical radiation field, GOOD_ASPECT is a threshold, and HUGE_PENALTY is used to penalize a hypothesis that leads to exceptionally elongated radiation field.

Region-oriented FOMs 1. centrality: piecewise continuous; centrality of the hypothetical radiation field $$centrality = (centratity_i + centrality_j)/2 \quad (23)$$

where $$centrality_i \begin{cases} 1 - \dfrac{abs(cen_i - centroid_i)}{cen_i \times CENTRALITYBOUND} & \text{if } centrality_i < 0 \\ HUGE\_PENALTY & \text{otherwise} \end{cases} \quad (24)$$

and $$centrality_j \begin{cases} 1 - \dfrac{abs(cen_j - centroid_j)}{cen_j \times CENTRALITYBOUND} & \text{if } centrality_j < 0 \\ HUGE\_PENALTY & \text{otherwise} \end{cases} \quad (25)$$

where ($cen_i$, $cen_j$) is the coordinate of the image center, ($centroid_i$, $centroid_j$) is the coordinate of the centroid of the hypothetical radiation field. Unlike in many previous work which assumed that the radiation field always contains the center of the image, HUGE_PENALTY is used to discourage strongly off-center hypothesis. Note that CENTRALITY_BOUND is different for single-exposure images and multiple-exposure images in that it is smaller (e.g., 0.618) in former cases and larger (e.g., 0.83) in latter cases.

2. occupancy: piecewise continuous; if the occupancy ratio is defined as $$o\_ratio = \dfrac{\text{area of the hypothetical radiation field}}{\text{area of the whole image}} \quad (26)$$

then $$occupancy = \begin{cases} o\_ratio & o\_ratio > MIN\_OCCUPANCY \\ HUGE\_PENALTY & o\_ratio < MIN\_OCCUPANCY \end{cases} \quad (27)$$

where MIN_OCCUPANCY is a threshold, and HUGE_PENALTY is used to penalize a hypothesis that leads to a exceptionally small radiation field. Note that MIN_OCCUPANCY can be adjusted for multiple-exposure images.

3. boundary: continuous; goodness of the member blades $$boundary = \left( \sum_l goodblade_l \right)^2 \quad (28)$$

which is summed over all the member blades in the hypothesis.

4. perimeter: continuous; summation based on the lengths of the member blades $$perimeter = \sum_l P_l \quad (29)$$

over all the member blades in the hypothesis, where $$P_l = \begin{cases} REWARD & \text{if condition } A \\ PENALTY & \text{if condition } B \\ 0 & \text{otherwise} \end{cases} \quad (30)$$

where condition A: hits_in_band of the lth blade>LONG_BLADE condition B: hits_in_band×goodness of the lth blade<MIN_BIN_OCCUPANCY (31)

Note that LONG_BLADE and MIN_BIN_OCCUPANCY are adjusted according to (1) the assumed total number of blades, and (2) the adding order of the member blades. In particular, the LONG_BLADE and MIN_BIN_OCCUPANCY for the second blade are smaller compared to those for the first blade, and so on.

5. contrast: continuous; inside/outside radiation field contrast $$contrast = \dfrac{|mean_{inside} - mean_{outside}|}{variance_{inside} + variance_{outside}} \quad (32)$$

which is a function of the low-order gray-scale statistics of the inside and outside regions of the resulting radiation field. Note that the outside region of a radiation field is defined as the outside region within a separated simple sub-image in the case of multiple-exposure images.

The figure-of-merit of each node is obtained by accumulating all the above individual FOMs, as shown in the generic Equation (33). The additive nature of the method allows convenient tuning of the parameters and the relative weighting factors of the individual FOMs. In the current invention, the tuning is not conducted in an exam specific fashion. However, since exam type information is typically available (stored in header files) for CR images, such information can be utilized to develop an exam-type specific knowledge-based costing and reasoning process. While the current method seems sufficiently robust regardless of the exam type, this is worth exploring in further work. For example, the relative weighting factors of the FOMs can be tuned according to different exam types.

geometryFOM=orthogonality+parallelism+convexity+aspect
regionFOM=centrality+occupancy+contrast+boundary+perimeter FOM=geometryFOM+regionFOM (33)

The blade combination with the highest figure-of-merit above a predefined threshold, and that passes a final verification, is chosen as the estimate of the collimation. The predefined threshold can simply be the figure-of-merit of the NULL hypothesis if the figure-of-merit of the NULL hypothesis is chosen to be static. Of course, one can choose to dynamically determine the figure-of-merit of the null hypothesis. The criteria for verification are the following:

the final radiation field should not exclude significant background region the final radiation field should not be composed of background region for above 90% of its area the final radiation field should not exclude significant modulated or textured regions where a robust and efficient measure for modulation or texture is yet to be addressed.

The invention has been described in detail with particular reference to certain preferred embodiments thereof, but it will be understood that variations and modifications can be effected within the spirit and scope of the invention.

PARTS LIST 10 x-ray source
12 x-ray beam
14 body
16 storage phosphor
18,20 collimation plates
22 beam
24 laser
26 scanning deflector
28 drive
30 computer
32 photodetector
34 filter
36 AMP
38 analog-to-digital converter
40 digital memory
42 image processor
44 electronic display
46 printer
60 radiograph
62 collimation region
64 radiation region
66 line
68 collimation boundaries
70 skin-line
72 clutter
74 secondary collimation boundary
310 memory
300 digital computer
312 input device
314 display
316 processing unit
318 transportable storage medium drive
320 control/data bus
322 output device
324 storage media

What is claimed is:

1. A method of processing a digital radiographic image comprising the steps of:

providing a digital radiographic image having a plurality of radiation fields and collimation regions defined by collimation blades at least partially bounding said radiation fields;

detecting and classifying pixels of said digital radiographic image as collimation boundary transition pixels using smart edge detection based on a classifier and a prior knowledge of the collimation process;

line-level delineating of a plurality of candidate collimation blades from said collimation boundary transition pixels modeled as step edges with polarity from said collimation boundary transition pixels;

determining a plurality of candidate partition blade pairs from a list of said candidate collimation blades includes using a multiple-pass method;

determining at a region level the radiation field from the results of said determining step; wherein said determining step includes the steps of:

sorting said candidate partition blade pairs in to a list of such an order that said radiographic image can be continuously and recursively partitioned;

partitioning said radiographic image into a simple sub-image and a compound sub-image using the most likely partition blade pair on the said list, and taking said pair off said list thereafter;

repeating said partitioning process for said compound sub-image using the remaining partition blade pairs on said list; and collecting candidate collimation blades that belong to each valid said simple sub-image;

wherein said step of determining a plurality of candidate partition blade pairs from a list of said candidate collimation blades includes using a multiple-pass method of the following steps:

the first pass is a process of rule-based decision to identify all the possible combinations of candidate collimation blades that can construct a partition blade pair, including, in terms of rules, a blade pair should (i) have an intersection angle less than a predefined value, (ii) have opposite polarities, (iii) have the dominant part of either blade relative to the other blade on the side opposite to the polarity of the other blade, etc. If two pairs, e.g., (A,B) and (A,C), share the same blade A, and, B and C are linearly coherent, these two pairs are merged into one;

the second pass is a process of fuzzy score-based evidence accumulation to rank the likelihood of the candidate partition blade pairs including, in terms of fuzzy scores, a partition blade pair (i) should not be too close to the image borders, (ii) should have comparable lengths, (iii) should be present next to each other, (iv) should be nearly parallel, (v) should not be too far apart relative to the dimensions of said radiographic image, (vi) should have large spatial extent relative to the dimensions of said radiographic image, (vii) should be well composed, (viii) should have no significant direct exposure region or modulated region within the gap formed by the candidate partition blade pair in the cases of disconnected and minor overlapping radiation fields, or should have significant direct exposure region within the gap in the cases of major overlapping radiation fields, (ix) should have the dominant part of each blade on the outer side relative to the other blade according to the polarity of the other blade in the cases of disconnected and minor overlapping radiation fields, or should have the dominant part of each blade on the inner side relative to the other blade according to the polarity of the other blade in the case of major overlapping radiation fields; and the third pass is a process to select best partition blade pairs such that (1) only the best pair, in terms of the largest overall combined figure-of-merit, is selected among those that share a common partition blade, (2) only the better pair, in terms of the largest overall combined figure-of-merit, is selected if two pairs are too close to each other, (3) both pairs are rejected if majority of either of the blades in either pair falls within the gap formed by extending the candidate blades of the other pair to the borders of said radiographic image or said compound image, whichever applies, (4) only the inner pair is retained if majority of both of the blades in either pair falls within the gap formed by extending the candidate blades of the other pair to the borders of said radiographic image or said compound image, whichever applies.

2. The method of claim 1 wherein said sorting step is a process to guarantee an order such that (a) the dominant parts of the blades in all the remaining partition blade pairs are on the same side of the pair being examined, (b) the pair being examined has the highest possible figure-of-merit.

3. The method of claim 1 wherein said partitioning step includes verifying that within the gap formed by extending said pair of candidate partition blades to the borders of said radiographic image or said compound image, whichever applies, there is no significant number of direct exposure pixels or edge pixels in the cases of disconnected and minor overlapping radiation fields, and there is a significant number of direct exposure pixels in the cases of major overlapping radiation fields.

4. The method of claim 1 wherein said collecting step includes merging the collimation blades that belong to each simple sub-image if they are linearly coherent.

5. The method of claim 1 wherein said collecting step includes a rule-based decision process on the legitimacy of candidate collimation blades that belong to each simple sub-image, including, in terms of rules, there should be no significant collimation blades, edge pixels or direct exposure pixels in the outer half plane defined by said blade according to the polarity of said blade.

6. The method of claim 1 wherein said collecting step includes assigning goodness measures to each of said candidate collimation blades that belong to each simple sub-image.

7. A method of processing a digital radiographic image comprising the steps of;
providing a digital radiographic image having a plurality of radiation fields and collimation regions defined by commimation blades at least partially bounding said radiation fields;
detecting and classifying pixels of said digital radiographic images as collmation boundary transition pixels;
line-level delineating of a plurality of candidate collimation blades from said collimation boundary transition pixels;
estimating the most likely partitioning; and
determining at a region level the radiation field from the results of said estimating step;
wherein said line-level delineating step includes the following steps:
performing a Hough Transform on the boundary label image produced by said detecting and classifying steps;
upon completion of the Hough Transform, performing peak detection to delineate lines; and
selecting only line segments that will make possible candidates of collimation blades.

8. The method of claim 7 wherein said digital radiographic image is provided by a computed radiography system.

9. The method of claim 7 wherein said digital radiographic image is provided by a direct radiography system.

10. The method of claim 7 wherein said digital radiographic image is provided by digitizing a radiographic image presented on visual media, such as film.

11. The method of claim 7 wherein said detecting and classifying step includes the steps of:
computing an estimate of the direct exposure region of the image and it's gray level values;
identifying all significant transitions in each line and column of the image;
computing features associated with each transition;
detecting collimation/direct-exposure boundary transitions using a classifier applied to the features computed for each transition;
computing an estimate of the gray level maxima of the collimation region based on the results of said collimation/direct-exposure detection step; and
detecting the collimation/tissue boundary transitions based on the transition's proximity to spanning the collimation maxima, as well as the it's gray level range and maximum gradient.

12. The method of claim 7 wherein said peak detection performing step includes a twisted extension of the Hough plane, de-noising by a spatial filter, and peak detection within a local window.

13. The method of claim 7 wherein said selecting step includes forming narrow-bands determined by said peaks in said Hough plane, and, within each of said narrow-band, neglecting small gaps and using large gaps to segment the lines into a group of candidate collimation blades.

14. The method of claim 7 wherein said selecting step is a process of fuzzy score-based evidence accumulation including, in terms of fuzzy scores, a candidate blade should also be (a) well connected, (b) fairly straight, (c) well composed, (d) fairly completed, etc.

15. The method of claim 6 wherein said region level determining step includes the following steps:
ranking the candidate collimation blades determined by the said line-level delineating step with respect to their goodness measures;
representing each possible legitimate combination of the candidate blades by a node in a hypothesis test tree, with the root node corresponding to a NULL or "no collimation" hypothesis and with there being a total of N levels of nodes for N collimation blades;
traversing the hypothesis test tree in a depth-first fashion, and eliminate bad hypothesis from further evaluation;
assigning to each legitimate blade combination, a figure-of-merit total based on the sum of geometry and region based figures-of-merit consistent with the collimation process model; and
choosing the blade combination with the highest total figure-of-merit above a predetermined threshold as the estimate of the collimation field.

16. The method of claim 15 wherein said assigning step also includes the step of final verification of said chosen blade combination using the following criteria: (a) the final radiation field does not exclude significant background region in said sub-image; (b) the final radiation field does not contain background region above a predetermined threshold related to its area; and (c) the final radiation field does not exclude significant modulated or textured regions in said sub-image.

17. The method of claim 15 wherein said assigning step is performed using the following formula:

$$FOM = geometryFOM + regionFOM$$

where $FOM = $ sum of all FOMs geometryFOM=orthogonality+parallelism+convexity+aspect regionFOM=centrality+occupancy+boundary+perimeter.

18. The method of claim 7 where in said detecting through determining steps include using a direct exposure detection method.

19. The method of claim 7 where in said detecting through determining steps include using body-part information.

20. The method according to claim 7 wherein image processing is performed on said radiographic image based on a collection of said extracted radiation fields.

21. The method according to claim 7 wherein image processing is performed on each of said radiation fields based on each of said extracted radiation fields.

22. The method according to claim 7 wherein image processing is performed on said non-signal collimation region.

23. A computer storage product comprising:
 a computer readable storage medium having a computer program stored thereon for performing the method of claim 7.

* * * * *